US012483321B2

(12) United States Patent
Fine et al.

(10) Patent No.: US 12,483,321 B2
(45) Date of Patent: Nov. 25, 2025

(54) POWER SAVING SATELLITE CONNECTION FOR LOW CAPABILITY DEVICE

(71) Applicants: THALES DIS FRANCE SAS, Meudon (FR); THALES, Courbevoie (FR)

(72) Inventors: Jean-Yves Fine, Marseilles (FR); David Bohaty, Prague (CZ); Lars Wehmeier, Falkensee (DE); Mohamed El Jaafari, Auterive (FR); Volker Breuer, Boetzow (DE); Nicolas Chuberre, Pibrac (FR)

(73) Assignees: THALES DIS FRANCE SAS, Meudon (FR); THALES, Meudon (FR)

( * ) Notice: Subject to any disclaimer, the term of this patent is extended or adjusted under 35 U.S.C. 154(b) by 302 days.

(21) Appl. No.: 18/262,926

(22) PCT Filed: Jan. 13, 2022

(86) PCT No.: PCT/EP2022/050588
§ 371 (c)(1),
(2) Date: Jul. 26, 2023

(87) PCT Pub. No.: WO2022/161773
PCT Pub. Date: Aug. 4, 2022

(65) Prior Publication Data
US 2024/0129024 A1    Apr. 18, 2024

(30) Foreign Application Priority Data
Jan. 29, 2021 (EP) ...................................... 21305122

(51) Int. Cl.
*H04B 7/185* (2006.01)
*H04W 52/02* (2009.01)

(52) U.S. Cl.
CPC ..... *H04B 7/18513* (2013.01); *H04B 7/18521* (2013.01); *H04W 52/0216* (2013.01)

(58) Field of Classification Search
CPC ............ H04B 7/18513; H04B 7/18521; H04B 7/18519; H04B 7/185; H04B 7/18515;
(Continued)

(56) References Cited

U.S. PATENT DOCUMENTS

2002/0123347 A1* 9/2002 Chambers ............. H04W 68/02
455/435.1

FOREIGN PATENT DOCUMENTS

CN    111294735 A    6/2020

OTHER PUBLICATIONS

International Search Report (PCT/ISA/210) and Written Opinion (PCT/ISA/237) mailed on Mar. 15, 2022, by the European Patent Office as the International Searching Authority for current International Application No. PCT/EP2022/050588—[16 pages].
(Continued)

*Primary Examiner* — Keith Ferguson

(57) ABSTRACT

Provided is a low capability device (UE) active in a communication system comprising a plurality of satellites (Si, Sj) insuring a temporally continuous communication coverage for the low capability device (UE), said satellites being further grouped in families (S1x), satellites of a same family (S1x) sharing same and common access information, said device (UE) comprises a power saving module to send to the serving satellite (S11), during a first data session, a next access request for a next or continued data session with time indications including at least a desired next time interval to be granted for communication. Other embodiments disclosed.

7 Claims, 2 Drawing Sheets

(58) Field of Classification Search
CPC ............. H04B 7/18539; H04B 7/1853; H04W 52/0216; H04W 52/0212; H04W 52/0209; H04W 52/00; H04W 52/02
See application file for complete search history.

(56) References Cited

OTHER PUBLICATIONS

Xiaomi: "Cell selection and reselection for IoT NTN", 3GPP Draft; R2-2100808, 3rd Generation Partnership Project (3GPP), Mobile Competence Centre ; vol. RAN WG2, No. e-Meeting; Jan. 25, 2021-Feb. 5, 2021; Jan. 15, 2021 (Jan. 15, 2021), XP051973912, Retrieved from the Internet: URL:https://ftp.3gpp.org/tsg_ran/WG2_RL2/TSGR2_113-e/Docs/R2-2100808.zip R2-2100808 Cell selection and reselection for IoT NTN.doc [retrieved on Jan. 15, 2021]—Sections 2.1 and 2.2.

Gatehouse et al: "Discussion on the service link discontinuity and affected procedures for NB-IoT NTN", 3GPP Draft; R2-2101248, 3RD Generation Partnership Project (3GPP), vol. Ran WG2, No. e-Meeting; Jan. 25, 2021-Feb. 5, 2021; Jan. 14, 2021 (Jan. 14, 2021), XP051972859, Retrieved from the Internet: URL:https://ftp.3gpp.org/tsg_ran/WG2_RL2/T SGR2_113-e/Docs/R2-2101248.zip R2-2101248 Discussion on the Service Link discontinuity and affected procedures for NB-IoT NTN.docx; [retrieved on Jan. 14, 2021] Section 3.

* cited by examiner

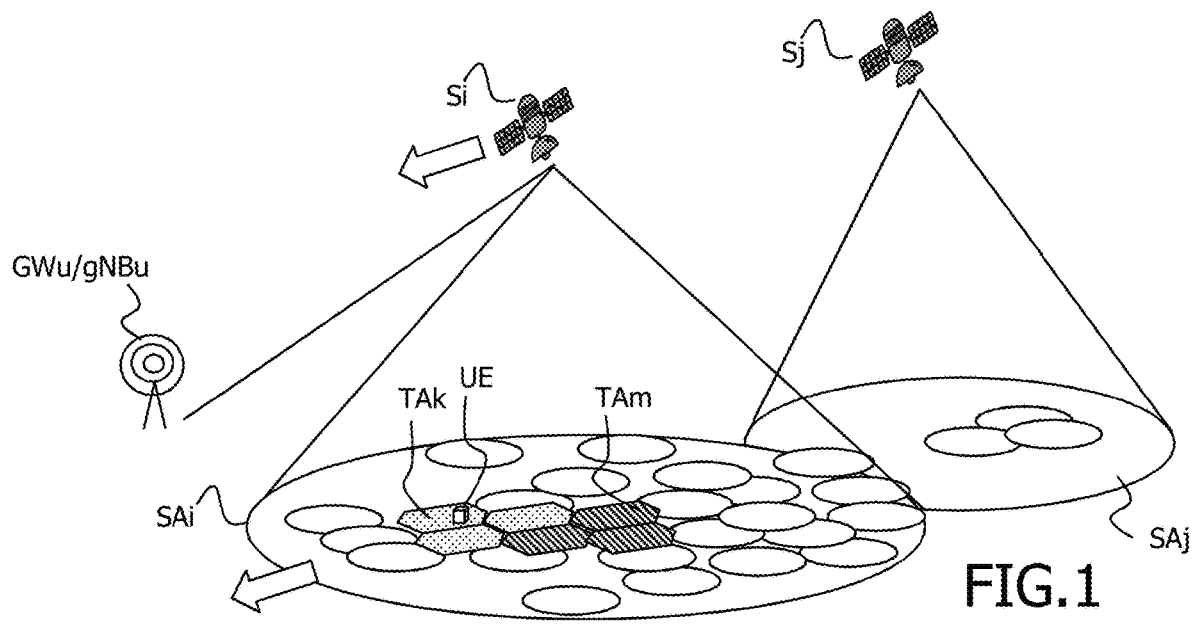
FIG.1
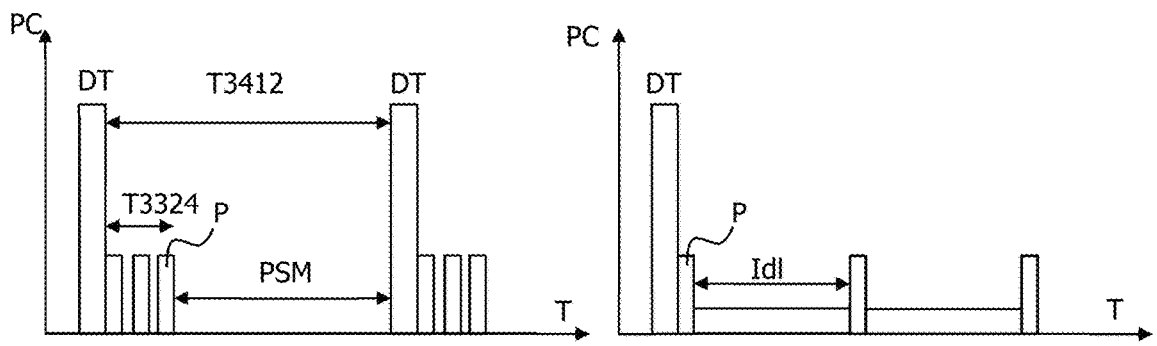
FIG.2
FIG.3
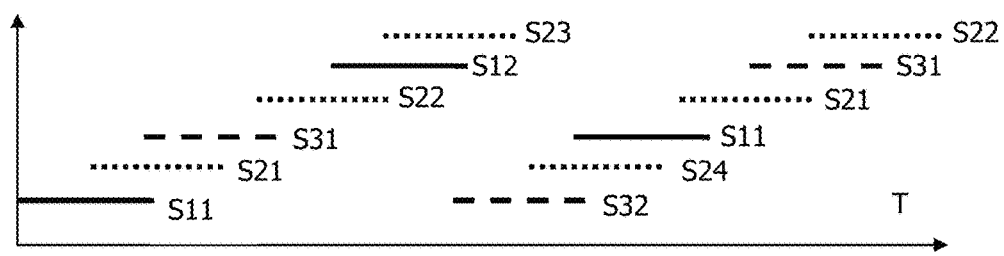
FIG.4

POWER SAVING SATELLITE CONNECTION FOR LOW CAPABILITY DEVICE

FIELD

The present invention relates to a low capability device active in a communication system comprising a plurality of satellites insuring a temporally continuous communication coverage for the low capability device, said satellites being further grouped in families, satellites of a same family sharing same and common access information.

The invention also pertains to a method to manage data sessions in a low capability device active in a communication system comprising a plurality of satellites insuring a temporally continuous communication coverage for the low capability device, said satellites being further grouped in families, satellites of a same family sharing same and common access information.

BACKGROUND

The invention concerns any low capacity device being able to connect to satellite and earth based radio. It especially concerns NB-IoT devices using power saving techniques such as PSM (Power Saving Mode) or MICO and eDRX (extended Discontinuous Reception) mechanisms, which are special enhancements to NB-lot/Cat-M idle mode when camping on a base station. With such mechanisms, specially related procedures and behaviors change in relation to the satellite radio interface for which power consumption is a concern, and also for corresponding network Access Node.

Thus the invention is especially related to problems occurring in conjunction to idle procedures being especially related to eDRX and PSM/MICO mode. These mechanisms having fixed raster for the device when to weak-up and for listening to paging received by the network. PSM/MICO is used when the device wakes up once every view hours and eDRX cycle duration can be up to 3 hours, i.e. 4096×1024× 10 ms. Here, each frame has a duration of 10 ms and 4096 frames are differentiated via SFN 0 to 4095. To allow for eDRX periods exceeding the SFN a Hyper-SFN of 0-1023 was introduced. It means eDRX for NB-IoT especially static devices can be realized up to ~3 hours, the times and granularity is just a magnitude of the SFN/H-SFN.

Without any synchronization between device and satellite motion, the device will, at each new wake up or Radio Resource connection, perform complete cell selection/acquisition cycle to get new radio cell and this will generate power consumption overhead. It also means that a device needs besides getting synchronized also acquiring all SIBs from other cells if it deviates from the prior camping cell.

PSM and eDRX adaptation is proposed in US20200107237 where eDRX or PSM can be configured such that devices in each temporary cell of the UAV-BS are awake when the UAV-BS establishes a temporary cell. In this document the communication is effective when flying BS is present thanks to the alignment of eDRX and PSM. The timer T3412 is adapted. This is limitative for the device in case of specific needs that require a next connection before the UAV-BS establishes a next temporary cell. Also the device is entirely monitored by the network and does not have any means to request pre scheduled reconnection.

Larger sleep cycles are especially considered for static devices where in combination with waking up in already known cell. In such cases, a reconfirmation of the valid SIBs is required by accessing MIB and SIB1-NB at the most, whilst for unknown/new cells entire SIBs need to be read.

However, when looking at satellite constellation of a non-terrestrial network (NTN) for NB-IoT, the term "static" has a new meaning, i.e. a device can be static but the satellite base-station is moving. In such circumstances, when the device wakes up, it sees a certain cell which may be different than the last cell it has previously seen. A cell is here to be understood as a satellite or a beam of a satellite.

The present invention objective is to provide optimization methods of Radio Resource connection between device implementing eDRX & PSM and 5G Satellite radio access network being under 3GPP standardization in rel17.

eDRX and PSM are mechanisms to limit radio transmissions of the device to certain periods of time, defining corresponding timers. eDRX and PSM are based on radio timing, for new radio (NR) via NTN eDRX and PSM. On the network side, 5G satellite constellation provides moving cell radio coverage following the motion of satellites.

The invention proposes to further reduce power consumption while however insuring punctual or continuous connection with satellites according to configuration of the device.

Further alternative and advantageous solutions would, accordingly, be desirable in the art.

SUMMARY

The present invention aims at enabling low power reconnection of low capacity devices to satellites base stations.

The present invention is defined, in its broadest sense, as a low capacity device, having performed a first communication session with a serving satellite of one family for a data session, being further such that it comprises a power saving module to send to the serving satellite, during the first data session, a next access request for a next or continued data session with time indications including at least a desired next time interval to be granted for communication, said power saving module being also adapted to receive, from the serving satellite, and to process assigned timing information for a next connection to a satellite of the same family, said assigned timing information being determined such that it indicates to the device idle mode synchronization information in order for a paging to occur at the occurrence of the assigned time information, corresponding to the desired time interval requested by the device, with a designated next satellite of the same family, said power saving module being such that it then adapts the idle mode according to the idle mode synchronization information in order for the device to receive information from the next satellite of the same family and to connect to the designated next satellite of the same family, reusing same and common access information as read for the previously serving satellite.

With the invention, the low capability device informs the serving satellite of its need for a next connection in an interval of time that is defined by the low capability device depending on the next service to be performed. As the satellite service is structured in order to always have an available satellite, the device could simply perform a paging whatever being the time but it would request a lot of resources in terms of energy. The invention avoids this wastage of energy.

NB-IoT traffic is in most cases delay tolerant/periodic. Due to power reasons, being even more important for satellite communication, all unnecessary reading and receiving of system information needs to be minimized.

Furthermore NB-IoT traffic or traffic in general of low capability devices, especially when applying C-IOT optimization, means sending small data packets via NAS signaling. The duration of such a session is very short, means just sending a few packets. It also means that, when being aware of the presence of a satellite and, for non-geostationary satellites, how long the presence will last, the NB-IoT device can not only schedule its session according to the presence of a certain satellite but also when to start to avoid session handover to another satellite due to disappearance of said satellite. Anyway NB-IoT only supports RLF-based re-establishment means staying connected unless connection breaks and resuming afterwards with another communication base station. As in case of satellite the base station appears and disappears also the duration how long visible plays a role for the session planning and execution in the device.

This is especially important for low-orbit satellites having smallest visibility duration but being most attractive for non-terrestrial-networks (NTN) as having smallest pathloss and easiest reachability.

As the satellites are grouped and as they share same and common access information, they can be reached more frequently than if a same satellite could only be used. It enables to give the low capacity device a control on the next connection depending on its need for the next service to be performed.

The time schedule of the family of satellites is known by the network and it enables the network to inform the device in return of a next possible time slot in the time interval requested by the device. The device thus monitors the need. The requested time interval can be coarse or sharp.

The device thus uses satellites of same configuration according to their circulations and thus appearance. The network gives indication on the passage of a next suitable satellite identified as being part of a satellite cluster having similar information. With the invention, timers and related behavior are adapted in accordance with the before mentioned connection being currently in use. In particular timers like PSM active timer T3324 or paging windows are adapted in the device to presence of satellites.

The before mentioned presence awareness can be sued to adapt the paging windows and also session time in such a manner that any handover or RLF re-establishment with other satellites for any of the periodic short duration calls can be avoided.

Satellite constellations having identical or similar configurations minimize SIB acquisition from satellites for low capacity devices.

The invention introduces new information elements in the broadcast identifying common satellite information allowing to minimize the number of SIBs that need to be acquired when the next cell appears. The device knows in advance that the next satellite is from a family that it knows and so it does not need to acquire the whole access information. It thus skips the reading of the SIB except the master information block MIB.

Therefore, the present invention allows reducing power consumption while reconnecting to the next satellite to be used by the device.

According to an advantageous features, assigned timing information for resuming or continuing communication being related to the presence duration of a next satellite of the same satellite family, it indicates idle mode synchronization information in order for a paging to occur, in the desired time interval requested by the device, using idle mode adaptation in the device, in early phase of reachability of the next available satellite of the same family and in order for said next data session to be performed and terminated prior reachability of the next satellite being of the same satellite family terminates.

This feature enables paging to be performed, not only during the presence of the satellite, but also early relative to the presence duration of the satellite. It avoids to start a paging once the satellite will disappear, thus at the end of the presence duration, which would prevent the device to perform service in good conditions. It also avoids the necessity for the device to request a further satellite that could be of another family to be contacted for further continuous addressed services. This feature enables the device to be indirectly informed about how long the next satellite will be there. It also enables the device to take into account the end of the presence of the next satellite as it is only available for short time.

According to a more precise feature, assigned timing information indicates to the device idle mode synchronization information in order for a paging to occur, in the desired time interval requested by the device, using idle mode adaptation in the device, no later than the end of the first quarter of presence of a next available satellite of the same family and in order for the next data session to be performed before the beginning of the last quarter of presence of this next available satellite.

This feature insures connection to be realized before the remaining presence of the satellite to be too short to enable the device to perform its service and the satellite to be free again to perform other necessary operation following the connection of the device, including getting downlink with confirmation for the device. An empty last quarter enables this feedback in due time before the device being again not connected at all.

The present invention also relates to a method to manage data sessions in a low capability device active in a communication system comprising a plurality of satellites insuring a temporally continuous communication coverage for the low capability device, said satellites being further grouped in families, satellites of a same family sharing same and common access information, said method comprising a preliminary step of performing a first communication session with a serving satellite of one family for a data session, during which the same and common access information are read, said method then comprising the following steps to save power for next or continued data session:

sending, to the serving satellite, during the first data session, a next access request for a next or continued data session with time indications including at least a desired next time interval to be granted for communication, receiving, from the serving satellite, and processing assigned timing information for a next connection to a satellite of the same family, said assigned timing information being determined such that it indicates to the device idle mode synchronization information in order for a paging to occur at the occurrence of the assigned time information, corresponding to the desired time interval requested by the device, with a designated next satellite of the same family, adapting the idle mode according to the idle mode synchronization information in order for the device to receive information from the next satellite of the same family and to connect to the next designated satellite of the same family, reusing common access information as read for the previously serving satellite.

Features corresponding to the ones of the device of the invention are advantageously implemented in the method of the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 1 illustrates the context of the invention;

FIG. 2 shows a frame structure according to standardized Power Save Mode (PSM);

FIG. 3 shows a frame structure according to standardized eDRX; and

FIG. 4 schematically illustrates the presence of several satellites of distinct families according to the invention;

DETAILED DESCRIPTION

Figure 5:
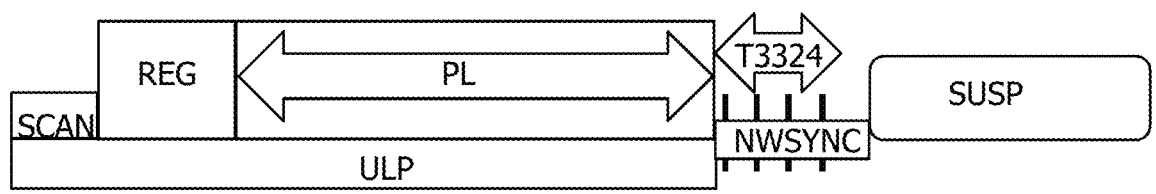
FIG. 5 shows a frame structure according to the standardized extended discontinuous reception (eDRX)

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a context where the invention is implemented. In this context, several satellites Si, Sj having a service area Sai, SAj on a earth field. Those satellites are connected to a terrestrial gateway or base station GWu/gNBu. In this context, each device is in a tracking area TAk, TAm.

A resource limited device D in a tracking area TAk is a device using power saving techniques such as PSM (Power Saving Mode) or MICO and eDRX (extended Discontinuous Reception) mechanisms. For this purpose it has a modem configured to apply one of the above mentioned power saving mechanism.

FIG. 2 shows schematically a raster used by a device using a Power Save Mode PSM showing the power consumption PC as a function of time T.

In this raster, a modem of the device D wakes up periodically to send data that can be Mobile Originated Data or Tracking Area Update TAU. The resulting data transfer DT is power consuming. A timer T3412 is active between two data transfer DT.

During this time interval, the modem monitors small paging windows P during which it can receive calls. The device D is here in idle mode and proceed to paging as usual nut only during a determined and shortened duration.

The PSM thus reduces the period during which this paging occurs to the duration of a timer T3324 where the device is active in idle mode. The power save mode consists in then interrupting the idle mode and introducing a period PSM during which the device D cannot be reached.

This mode thus eliminates page monitoring between data transmissions for device-originated or scheduled applications, e.g. smart metering, environmental metering etc.

On FIG. 3 is illustrated the extended discontinuous receive (eDRx). Here the modem takes time to monitor paging windows P that can be spaced by idle period Idl up to 40 minutes where today's upper limit is below 3 seconds. During the idle intervals, the device is not reachable.

This extends time between monitoring for network messages for device-terminated applications, e.g. object tracking or smart grid for example.

The invention is based on the implementation of clusters of cells carried by families of satellites. Those satellites of a same family share same and common access information.

This is illustrated on FIG. 4 where the presence at one given place of the earth of several families of satellites is schematically shown. At a certain location without any earth-based NB-IoT coverage, a device D sees depending on time satellites or cluster/family of satellites. Satellites of a same family are shown with a same line format. The whole set of satellites enables a continuous coverage for communication.

A first family S1X does not alone enables a continuous coverage as well as a third family S3X. A second family S2X enables a continuous coverage.

Said satellites have partially different SystemBroadcast Information, i.e. different tracking areas . . . . A device D connecting to/via the satellite needs to read/acquire some information first, unless it is the same satellite than a previous connection. In current implementation, eDRX and PSM sleep timing is radio frame fixed raster, i.e. 10, 24s, multiplied by $2^X$. There is no relation and no meaning in these values as such. The timers do not comply with satellite turn times and activity should be limited and packed to time for which the satellite is visible.

The satellite families according to the invention enables the PSM and the eDRX to be configured with more flexibility than in prior art. Paging windows or reachability for call back will occur during visibility of satellites of a same family only.

Indeed satellites of a same family share same and common access information enabling a device D to save power while connecting to, as far as possible, a satellite of a same family than for a last connection.

Indeed, the device does not need to read the entire SIBs but only one Information Element containing the identifier of the satellite, which is a short part of the SIB.

In seldom cases were more than the satellite identifier would deviate, the satellite can explicitly indicate in its SIB containing the identifier, preferably SIB 1 containing the scheduling information of all other SIBs, which of them are common for the family and which of them may deviate. For maximum gain all SIBs should be common or at least all SIBs being of use for such kind of low capability devices. Especially an exception may here be the SIBs containing the information related to neighbour cells/other satellites in proximity. However this information is also not relevant or important for the aforementioned use cases as handover execution or cell reselection because of a radio-link-failure (RLF) are anyway to be avoided when possible. The invention enables to avoid them with the information on the presence duration of a satellite and the fact that such devices have short duration communication sessions.

In general such information may be present anyhow in the satellite broadcast as also these satellites serve for other use cases/devices. Indeed such other use cases may also include other features which are not applied or used by low capability devices. Also those features may need to have support information in the broadcast. Hence communality of the SIB information needs to be achieved for maximum gain for the low capability devices for all relevant SIBs to avoid unnecessary reading and waist energy.

In general for the invention concerns the grouping of satellites called families which have characteristics to be beneficial to serve certain devices or certain services of devices.

More precisely, families of satellites are constituted by satellites having all SIBs common or all SIBs except SIB1 common. This is indicated in the SIB1 (or the MIB) respectively which is the discriminant of the satellites of a same family. Said information advantageously includes a versioning of the other SIBs, also if SIB information are updated seldom as it can however happen for satellites.

With the invention, the device D receives in SIB1 an information of the family i.e. family 1 or tracking area TA1. Hence it knows it can re-use all the other SIBs. It is only necessary for the device D to check that there is an indicated family and version in the information of SIB1, and hence it can reuse the previously acquired following SIBs, typically SIB2-20, without re-acquiring them again. This enables the device D to save power.

The invention further uses the gathering of satellites in families by making the device D monitoring next connection depending on its needs. With the invention the network fulfils the needs of the device D at its best while considering the availabilities of the satellites of one given family.

With the invention, when PSM is used, related to radio timers in idle mode or behavior in suspended mode, for PSM TAU (T3412), values are introduced which correspond to the circulation of satellites of a same family re-appearing at the position of the device D. While the satellites of a same family have same cell configuration, when one of them re-appears at the device D, the invention avoids unnecessary cell acquisition.

The call back timer T3324 is configured correspondingly to the presence at the device D location after TAU update was performed to avoid additional cell acquisition during said time. Thus PSM TAU update (T3412) values are introduced which correspond to the circulation of satellite cells of a same family.

On FIG. 5 is shown, in more details, a PSM raster. It comprises an underlying process ULP where data transfer occurs followed by a period of synchronization to the network NWSYNC using page monitoring illustrated by bold black lines, followed by a suspended period SUSP where the device D is not anymore active. This inactivity period is determined by the timer T3412.

In a first part of the underlying process, a scanning SCAN of an available satellite base station occurs, followed by a registration period REG where the device D attaches to a detected base station before payload PL is exchanged.

Figure 6:
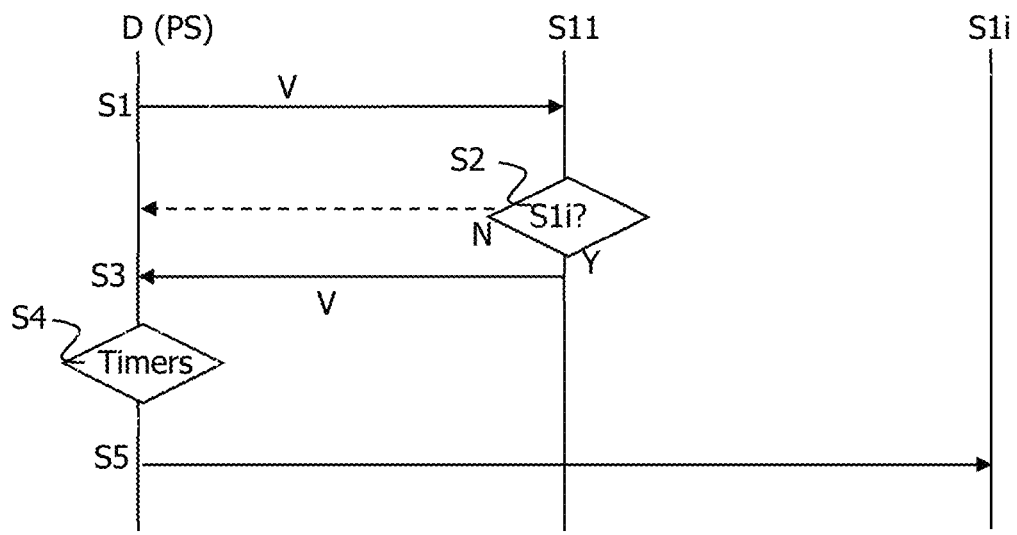
FIG. 6 schematically shows a time diagram of the method of the invention.

According to the procedure of the invention illustrated on FIG. 6, during the underlying process ULP, at the end of the payload PL exchange, the device D, more exactly its power saving module PS, proposes, in a step S1, a value V according to its communications need during PSM request. Thus advantageously, when the device D requests a sleeping time, the network, via the serving satellite, provides next smaller activity time complying to same satellite cluster, unless the device D requests a sharp timer, which would cause contacting a satellite of another family. This last case is not concerned by the invention.

This value enables the device D to inform the connected satellite base station S11 and thus the network of the needs of the device D in terms of quality of service QoS and of next requested time interval. It thus indicates a wish for next power efficient communication.

The satellite base station S11 currently in communication questions the network in relation with presence of next satellite of the same family S1i n a step S2. The currently serving satellite S11 then grants the needs of the device D if the currently connected satellite or another from the same family S1i will be available in a requested time interval present in the value V. In a step S3, it then provides at least the respective value V to the device D in a confirmation message. In such a case, the communication needs as requested by the device D are fulfilled.

The satellite base station S11 can also provide additional information on the next connection, like a more precise time interval that would be taken into account by the device by a timer update. Advantageously it thus provides the presence time of a next available satellite in the time interval requested by the device D. It enables the device D to be aware of the presence duration. The device D and the base station S1i are then able to act in a kind of predictive manner by adapting timers in a step S4. A next connection with the satellite S1i can then occur in a step S5. This connection is realized using the same access information than the previously acquired for the connection to satellite S11. This saves power and time for the device D.

The invention also enables to manage power and to address quality of service issues. For this purpose, it is important to know the potential duration of the certain connection, hence the presence of the satellites, to fit the device D traffic accordingly. This duration is advantageously provided in the value V that is returned by the currently connected satellite S11 to the device D.

The device D traffic can thus be better balanced and the device D is in a better position to decide and predict the potential Service to start and finish within the presence time that is proposed by the satellite. The device D can also interrupt a service and use the next presence time fitting to the needed QoS (GBR/MBR) requirements.

Thus the value V as returned by the base station S11 is advantageously accompanied by an information on the quality of service offered by the next satellite base station available in the requested time interval.

The invention enables the device D, considering the limited time each satellite is present, to distribute activities accordingly in said time. It also enables to select a specific satellite out-off the family of satellites for specific services requiring a specific continuous time interval or requiring a specific quality of service.

Indeed the device normal traffic periodicity is adapted to the appearance of the satellites. When the device requests a service, it indicates a coarse timer for that purpose and the satellite, knowing the time schedule of the satellites' circulation, confirms that a communication can be performed with always a same family of satellites. The timers T3324 and T3412 are modified accordingly in order for a time of appearance TAppearance to correspond to a next connection of the device D. A time of presence TPresent is also provided by the satellite in order for the device D to know the duration of presence of one satellite or of several satellite of a same family when applicable. In an implementation flight plan and table of available satellites can be provided to the device D and stored locally in the device D. In such implementation, the device D is independent in the management of its successive connection to the satellites of a same family.

With such information and modification, the device D knows when and for how long a specific satellite will be reachable, so it estimates the duration of its communication session. Advantageously the information sent by the connected satellite also includes feedback from contacted server leading to a time Tduration. It enables that, accordingly, the device D will start its session no later than Tduration from the end of TPresent, so that no handover, anyhow not possible for NB-IoT device or context transfer is necessary.

This adjustment of the activity of the device D when satellites are used is in the interest of both the device D and the network. Indeed context from one satellite to another satellite (earth based X2 interface/cable) needs free-space transmission, via earth or directly and the whole presence of the satellite cannot be dedicated to the activity of devices. The invention thus offers a reachability indication, regardless from which point the satellite is seen on earth, from the moment the satellite is detected by the device D to its disappearance, the presence duration lasting at maximum TPresent.

With the invention, the previous satellite indicates an appearance time TAppearance and a presence time TPresent based on the device request with coarse timer.

Communication is always possible but for power saving reasons is aligned, according to the invention, to appearance of a family of satellites out of all possible satellites, avoiding rereading the SIBs for delay tolerant services or any other power consuming activity when changing said communication partner.

The invention gives information to the device D on the availability, beginning and end of availability, thus presence duration, to a device D of a family of satellite's base stations out of all satellite's base stations, having common characteristics.

With the invention, the device D knows when a satellite appears and disappears, and can thus correlate paging, data session duration and call back or other services to this "in service time" of a special satellite's base station.

In the exemplary situation shown on FIG. 4, a satellite is always present at a specific location for non-delay tolerant traffic to be possible at any time. However handover are excluded for NB-IoT devices and a continuous communication is resource demanding. According to the invention, communication session for delay tolerant traffic is always done with a satellite from a same family. For longer session this may be distributed over visibility cycles of several satellites of a same family. For example, an alarming panel device will send its keep alive sending when a satellite of a given family is present but in emergency case it will send to any satellite which is present.

In many applications, NB-IoT has two data types: normal data and exceptional data which generally corresponds to LTE emergency call. Thus with the invention, normal data are handled by a same satellite or satellites of a same family and exceptional data to any satellite at hand. The device receiving an application notification acts towards the network accordingly.

Also the communication/service duration is adapted to the duration of presence of the satellite of the family. The device adapts services accordingly. Such service distribution on adapted and compatible satellite presence slot is a part of the invention.

The service time that is contemplated with the invention till it disappears is service+T3324 at maximum and afterwards sleep for T3412. Both timers are adapted according to the invention depending on the TDuration and on the requested service.

A satellite is always present but not necessarily a satellite belonging to same family. With the invention, the device is not aware of the family of satellites but it can tell "I will roughly communicate every X-minutes", "At which exact time can I do this best power efficient?". While answering, the Network, via the serving satellite, indicates which closest reappearing satellite could fit to that. If the device D says it is sharp time, network will reserve resources on any present satellite at said time. However, in case of sharp time, it will not necessarily be a satellite of a same family.

A provisioning of a value V related to the satellite re-appearance is performed for devices D not having the knowledge. It enables such a device D to align its PSM timers with the next satellite re-appearance.

PSM values consist of time unit, s/min/hours/days and corresponding digital values. Units and time may be adapted accordingly. Advantageously a multiple of a satellite period is used insuring a same satellite of a same family to be elected for reconnection.

The invention consists in fixing the sleep/idle value(s) of timer(s) to a value corresponding to the occurrence of given radio cells of a same family, identified by its broadcasted information.

In the context of successive connections according to the invention, the value can be further fixed by several means including device configuration, configuration by the network, computed by the device, knowing some satellite motion values, including Position Velocity Time (PVT) broadcasted on system information's, determined by the device D after learning phase.

However the procedure according to the invention comprises, as disclosed on FIG. 6, some steps where the device D informs the network of its needs and where the network provides the device D with information enabling an intelligent and power saving connection to a satellite.

Related to radio timers in idle or inactive mode, i.e. for 5G, eDRX values provided by the core network element, typically a Mobility Management Entity (MME/AMF), correspond to the circulation of satellite cells, till one satellite of a cluster/family of cells having same cell configuration/identity re-appears at a device D position. Here the core network element MME/AMF has knowledge on satellite constellation and circulations to adopt the requested PSM/eDRX values to correspondingly suitable values.

The invention enables the appearance of paging windows corresponding to the circulation of a family of satellite cells, till one of them re-appears at a device D position. The invention also concerns the duration of the connection in accordance to presence of a cell in a certain position.

It is here noted that timers such as SA2 related delivery timers depend on certain timings that could be relevant to be used according to the invention. The invention serves also to proceed to the deliverance of delay tolerant messages to be send to devices in accordance to above said timings.

As an exemplary implementation, a fix device is located in a place where a radio cell of a same family is received during M minutes each N hours. T3412 will be fixed to N*60-M. Depending on the mobility speed respectively N and M and the corresponding cell size, also mobile devices can be configured accordingly, as the speed of the device compared to the speed of the satellite/cell is negligible.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

The invention claimed is:

1. A low capability device (UE) active in a communication system comprising a plurality of satellites (Si,Sj) insuring a temporally continuous communication coverage for the low capability device (UE), said satellites (Si,Sj) being further grouped in families, satellites of a same family sharing same and common access information,
said device (UE), having performed a first communication session with a serving satellite (S11) of one family (S1x) for a data session, is such that it comprises a power saving module to send to the serving satellite (S11), during the first data session, a next access request for a next or continued data session with time indications including at least a desired next time interval to be granted for communication,
said power saving module being also adapted to receive, from the serving satellite (S11), and to process assigned timing information for a next connection to a satellite (S12) of the same family, said assigned timing information being determined such that it indicates to the device (UE) idle mode synchronization information in order for a paging to occur at the occurrence of the assigned time information, corresponding to the desired time interval requested by the device (UE), with a designated next satellite (S12) of the same family (S1x),
said power saving module being such that it then adapts the idle mode according to the idle mode synchronization information in order for the device (UE) to receive information from the next satellite (S12) of the same family and to connect to the next satellite (S12) of the same family, reusing same and common access information as read for the previously serving satellite (S11).

2. The low capability device according to claim 1, wherein assigned timing information for resuming or continuing communication being related to the presence duration of a next satellite (S12) of the same satellite family (S1x), it indicates idle mode synchronization information in order for a paging to occur, in the desired time interval requested by the device (UE), using idle mode adaptation in the device (UE), in early phase of reachability of the next available satellite (S12) of the same family (S1x) and in order for said next data session to be performed and terminated prior reachability of the next satellite (S12) being of the same satellite family (S1x) terminates.

3. The low capability device according to claim 2, wherein assigned timing information indicates to the device idle mode synchronization information in order for a paging to occur, in the desired time interval requested by the device (UE), using idle mode adaptation in the device (UE), no later than the end of the first quarter of presence of a next available satellite (S12) of the same family (S1x) and in order for the next data session to be performed before the beginning of the last quarter of presence of this next available satellite (S12).

4. A method to manage data sessions in a low capability device (UE) active in a communication system comprising a plurality of satellites (Si,Sj) insuring a temporally continuous communication coverage for the low capability device (UE), said satellites (Si,Sj) being further grouped in families (S1x), satellites of a same family (S1x) sharing same and common access information,
said method comprising a preliminary step of performing a first communication session with a serving satellite (S11) of one family (S1x) for a data session, during which the same and common access information are read,
said method then comprising the following steps to save power for next or continued data session:
sending, to the serving satellite (S11), during the first data session, a next access request for a next or continued data session with time indications including at least a desired next time interval to be granted for communication,
receiving, from the serving satellite (S11), and processing assigned timing information for a next connection to a satellite of the same family (S1x), said assigned timing information being determined such that it indicates to the device (UE) idle mode synchronization information in order for a paging to occur at the occurrence of the assigned time information, corresponding to the desired time interval requested by the device (UE), with a designated next satellite (S12) of the same family (S1x),
adapting the idle mode according to the idle mode synchronization information in order for the device (UE) to receive information from the next satellite (S12) of the same family (S1x) and to connect to the designated next satellite (S12) of the same family (S1x), reusing common access information as read for the previously serving satellite (S11).

5. The method according to claim 4, wherein assigned timing information for resuming or continuing communication being related to the presence duration of the next satellite (S12) of the same satellite family (S1x), it indicates idle mode synchronization information in order for a paging to occur, in the desired time interval requested by the device (UE), using idle mode adaptation in the device (UE), in early phase of reachability of the next available satellite (S12) of the same family (S1x) and in order for said next data session to be performed and terminated prior reachability of the next satellite (S12) being of the same satellite family (S1x) terminates.

6. A method according to claim 5, wherein assigned timing information indicates to the device (UE) idle mode synchronization information in order for a paging to occur, in the desired time interval requested by the device (UE), using idle mode adaptation in the device (UE), no later than the end of a first period of presence of a next available satellite (S12) of the same family (S1x) and in order for the next data session to be performed before the beginning of a last period of presence of this next available satellite (S12), wherein the first and the last period of presence is evaluated in such a way that a corresponding communication session is finalized prior disappearance of said next satellite (S12).

7. A method according to claim 6, wherein first period and last period of the presence of a next satellite correspond to any one of the following fractions: a quarter of the satellite presence, a third of the satellite presence.

\* \* \* \* \*